United States Patent [19]

Nestlen

[11] 4,306,602
[45] Dec. 22, 1981

[54] TIRE CHAIN TIGHTENER

[75] Inventor: David J. Nestlen, Portland, Oreg.

[73] Assignees: The Standard Steel Companies; Leland Waltuck; Brenda Berger, all of Portland, Oreg.

[21] Appl. No.: 149,302

[22] Filed: May 13, 1980

[51] Int. Cl.³ .................. B60C 27/00; A44B 21/00
[52] U.S. Cl. .................. 152/219; 24/69 TT; 24/316; 24/317; 152/241
[58] Field of Search ............ 152/219, 217, 241, 242, 152/218, 233; 85/8.8; 24/69 T, 69 TT, 73 CE, 231, 241 S, 317, 316, 326; 411/517, 518

[56] References Cited

U.S. PATENT DOCUMENTS

| | | | |
|---|---|---|---|
| 934,154 | 9/1909 | Fox | 24/69 TT |
| 1,310,456 | 7/1919 | Tawney | 24/69 TT |
| 1,418,149 | 5/1922 | Hubble | 24/69 TT |
| 1,419,565 | 6/1922 | Howg | 24/69 TT |
| 1,816,941 | 8/1931 | Thomas | 24/69 TT |
| 1,851,460 | 3/1932 | Stahl | 24/69 TT |
| 1,866,889 | 7/1932 | Heinecke | 24/69 TT |
| 2,123,864 | 7/1938 | Stahl | 24/69 TT |
| 2,153,003 | 4/1939 | Myers et al. | 24/69 TT |
| 2,456,355 | 12/1948 | Aber | 85/8.8 |
| 2,612,670 | 10/1952 | St. Pierre | 24/69 TT |
| 3,770,036 | 11/1973 | Sherman | 85/8.8 X |

*Primary Examiner*—William A. Powell
*Assistant Examiner*—Thomas Bokan
*Attorney, Agent, or Firm*—Kolisch, Hartwell & Dickinson

[57] ABSTRACT

A novel tire chain tightener for interconnecting opposed end links of a perimeter chain of a tire chain mounted on a tire includes an arcuate handle member including a free end and a lug end, the lug end being pivotally connected to an end link of the perimeter chain with the free end being insertable into an opposite end link of the perimeter chain and movable therethrough to draw up the perimeter chain into a locked position. The handle member is dimensioned for gripping by all of the fingers of an individual's hand and a catch is disposed adjacent the lug end for receiving and holding the opposite end link in a locked position. Additionally, the lug end is provided with an eyelet for pivotally receiving the end link with the catch including a notch having a circular portion configured for nesting the opposite end link in the locked position. The eyelet and the notch are positioned relative to one another so that an imaginary line interconnecting their centers and extended toward the free end is spaced from the free end.

7 Claims, 7 Drawing Figures

TIRE CHAIN TIGHTENER

BACKGROUND AND SUMMARY OF THE INVENTION

The present invention relates to tire chains and more particularly to a novel chain tightener for tightening and locking heavy-duty tire chains mounted on large tires such as truck, bus or construction equipment tires.

Prior art chain tighteners developed for fastening and locking tire chains on tires generally include some type of caming element which interconnects opposed end links of one of the perimeter chains of a tire chain. The caming element may be suitably manipulated, either by a tool or an individual's fingers so as to be shifted into a locking position. Generally, chain tighteners which do not utilize special fastening tools include some type of shiftable clasp or deadlock for securing the caming element. Unfortunately, clasps may become damaged or corroded rendering them difficult to use.

Such a chain fastener is exemplified in Stahl, U.S. Pat. No. 1,851,460 which describes a cam lever connected to an end link of one end of a side or perimeter chain. The cam lever may be suitably inserted through an end link of the opposite end of the perimeter chain and pivoted so as to draw the two ends toward one another. A projection on the cam lever is ultimately inserted through an adjacent link so that a keeper, slidably mounted on the link may be positioned over the projection to lock the cam lever in position. Further prior art devices utilizing this same general principal include, amongst others, Thomas (U.S. Pat. No. 1,816,941), Myers et al (U.S. Pat. No. 2,153,003), Stahl (U.S. Pat. No. 2,123,864), St. Pierre (U.S. Pat. No. 2,162,670) and Tawney (U.S. Pat. No. 1,310,456). Additionally, there are disclosed in prior U.S. patents chain tighteners which utilize some type of hook or connecting element on the end of a cam lever to maintain the cam lever in a locked position. Exemplary of this concept are Fox (U.S. Pat. No. 934,154), Howg (U.S. Pat. No. 1,419,565) and Heinecke (U.S. Pat. No. 1,866,889). A tire chain fastener is also disclosed in Hubble (U.S. Pat. No. 1,418,149) which utilizes, in one embodiment, a sinuous-shaped hook manually positionable through an end link of a chain for drawing the ends of the chain together.

With respect to large heavy-duty tire chains, such as those used on truck tires, it can be appreciated that tightening of the tire chains is a difficult chore requiring substantial effort to draw the ends of a perimeter chain toward one another. To this end, it has generally been the practice to utilize special types of tools or wrenches which may be connected to cam-like tighteners for effecting tightening action. Of course, it can be appreciated that such tools can become lost or broken and are generally inconvenient. It is apparent that if a chain tightener could be utilizied without the necessity of tools and operable for manually tightening a truck tire chain, such a chain tightener would be extremely advantageous.

Additionally, in the case of truck tire chains, it is necessary to provide a chain tightener which is strong enough for holding ends of a perimeter chain together but which maintains a relatively low profile. Stated differently, the chain tightener must not extend beyond the perimeter chain an amount which would result in the tightener contacting the road. Such contact would result in damage to the chain tightener and could impair it from its normal operation. Additionally, the profile of the chain tightener becomes important when it is recognized that cross chains on truck tire chains have been shortened thereby drawing the perimeter chains of the tire chain closer to the road engaging surface of the tire.

Accordingly, it is a general object of the present invention to provide a novel chain tightener for interconnecting opposed end links of a perimeter chain of a tire chain mounted on a tire which includes an arcuate handle member having a free end and a lug end with the lug end being pivotally connected to an end link of the perimeter chain. The arcuate handle is dimensioned for complete gripping by an individual's hand so that when the free end of the arcuate handle is inserted through an opposed end link on the perimeter chain, an individual may rigidly grip the arcuate handle and force it toward the other side of the perimeter chain thereby providing camming action drawing up the perimeter chain. The free end is then inserted into a receiving link in a locked position. A catch means or notch is disposed adjacent the lug end and receives and holds the opposite end link when the perimeter chain is in the locked position.

Another object of the present invention is to provide a chain tightener, as described above, in which the lug end is provided with an eyelet for pivotally receiving the end link and wherein the catch means includes a notch having a circular portion configured for nesting the opposite end link in the locked position. The eyelet and the notch are positiond relative to one another so that an imaginary line interconnecting their centers and extended toward the free end is spaced from the free end. This configuration results in a low profile when the chain tightener is in the locked position.

Still another object of the present invention is to provide a chain tightener, as described above, in which the arcuate handle member, which doubles as a cam lever, is dimensioned with opposed concave-convex sides, with the concave side being generally defined by an arc having a radial dimension residing in the range of about 2 to $3\frac{1}{2}$ inches. With the arc length of the handle member being dimensioned generally in the range of about 3 to 5 inches, sufficient handle area is provided for complete gripping or grasping by an individual with the handle member held in the palm and gripped firmly thereagainst by the fingers. With a firm grasp on the handle member, an individual may impart sufficient force to cam the chain tightener into a locked position.

These and additional objects and advantages of the present invention will become more clearly understood from a consideration of the drawings and the following detailed description of the preferred embodiment.

DETAILED DESCRIPTION OF THE PREFERRED EMBODIMENT

Figure 1:
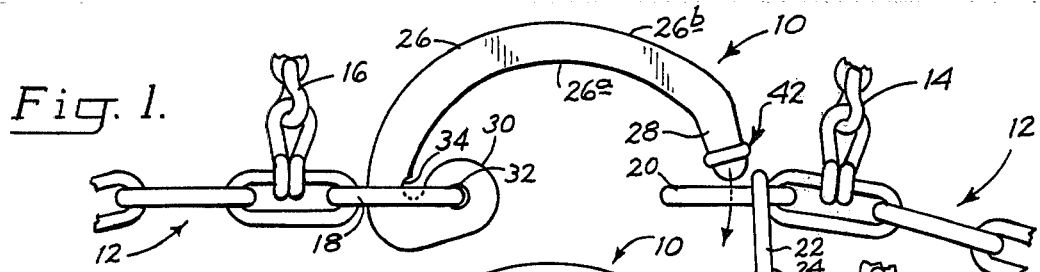
FIG. 1 is a side elevation view of a portion of a tire chain, and more particularly a view of a portion of a side perimeter chain illustrating initial positioning of the chain tightener of the present invention prior to a sequence for drawing up ends of the perimeter chain.

Turning now to the drawings, a detailed description of a chain tightener in accordance with the present invention in a preferred embodiment will now be set forth. In FIG. 1, a chain tightener in accordance with the present invention, generally indicated at 10, is shown prior to interconnecting opposed end links of a perimeter chain of a tire chain mounted on a tire. The tire chain is a large heavy-duty one with one perimeter chain being generally indicated at 12, and a pair of cross chains, of conventional construction, shown at 14, 16. It is assumed that the tire chain is mounted on a tire (such as a tire T shown in FIG. 5) and that the cross chains, such as indicated at 14, 16 overlap the riding surface of the tire and are connected at their opposite ends to another perimeter chain which is hidden.

The perimeter chains are of conventional construction, and perimeter chain 12 includes a first end link 18, and at its opposite end another series of end links one of which is indicated at 20 and the others at 22, 24, etc. End link 20 has been preselected for interconnecting with chain tightener 10 so that the ends of perimeter chain 12 may be drawn toward one another for tightening the tire chain.

Figure 5:
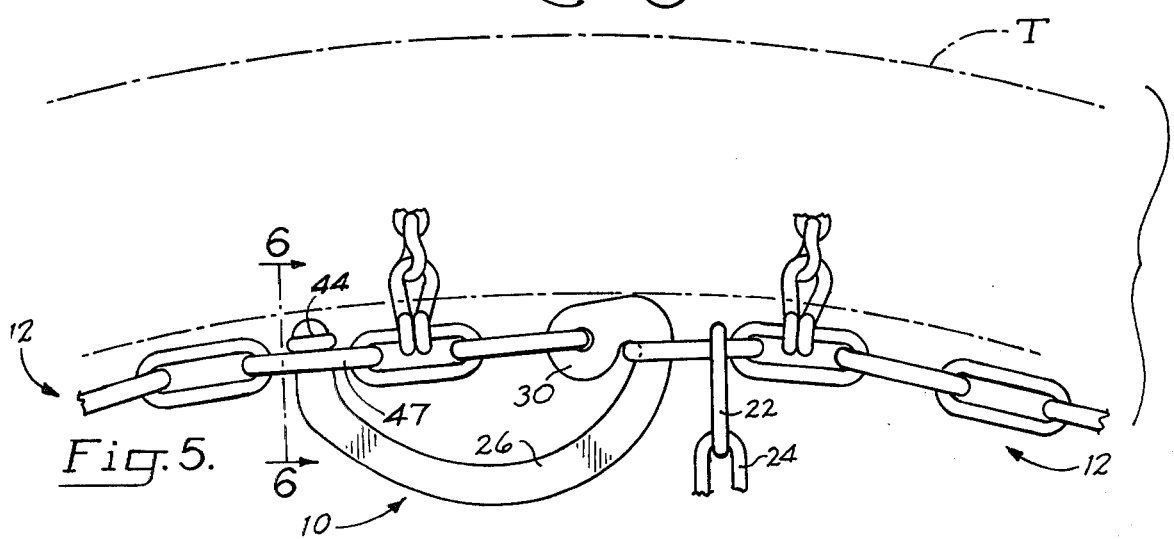
FIG. 5 is a view similar to FIGS. 1-4 illustrating inserting of the free end through a receiving link so that the chain tightener is stabilized.

Turning to details of chain tightener 10, it can be seen that it is formed from plate material and includes an arcuate handle member indicated at 26 having a free end 28 and a lug end 30. The lug end is provided with a circular eyelet 32 for receiving end link 18. Thus, it can be appreciated that the chain tightener is pivotally connected to end link 18. Also, it can be seen that end lug 30 includes a catch means or notch indicated at 34 which is defined by a circular portion configured for nesting an opposite end link, such as end link 20 when the chain tightener is pivoted and cammed to the locked position. It is to be noted that the eyelet and notch are positioned, relative to one another so that if an imaginary line were to be drawn interconnecting the center of eyelet 32 and notch 34, and was extended, such an imaginary line would be disposed above free end 28. This configuration can be best appreciated from a consideration of FIG. 3 which shows an imaginary line, indicated at 36 in phantom lines, extended above free end 28. By so positioning the relative centers of eyelet 32 and notch 34, relative to free end 28, a reduced profile will be provided when chain tightener 10 is in the locked position as shown in FIG. 5.

Figure 2:
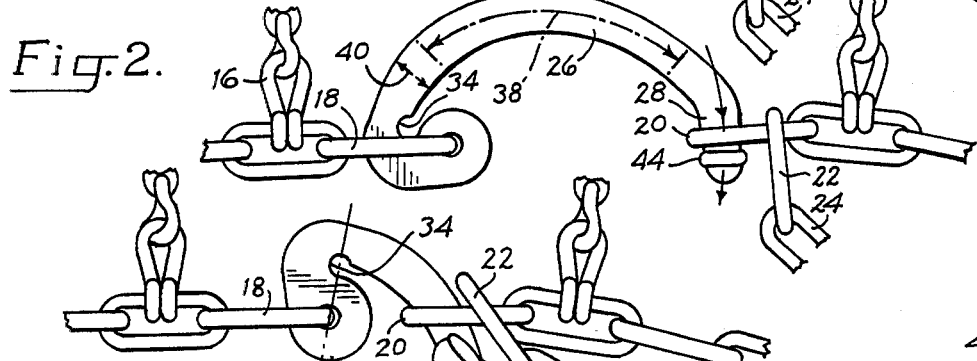
FIG. 2 is a view similar to FIG. 1 illustrating insertion of a free end of the chain tightener into a selected end link of the perimeter chain.

Considering additional features of chain tightener 10, it is noted that handle member 26, being arcuate in outline, is formed with opposed concave-convex sides. More particularly, a concave side is indicated at 26a and a convex side at 26b. End lug 30 is oriented or recurved toward concave side 26a of handle member 26. As mentioned previously, one of the objects of the present invention is to provide a handle member dimensioned so that it can be securely gripped or grasped by an individual's hand so that the individual has leverage to impart sufficient force during caming action to the tightener so that the ends of the perimeter chain may be drawn together to thereby tighten a tire chain. Thus, it is necessary to dimension handle member 26 so that a certain stretch or expanse of material is provided for sufficient gripping with the handle member held in the palm and clenched thereagainst by an individual's fingers. To this end, handle member 26 includes a mid-portion dimensioned with an arc length generally in the range of about 3 to 5 inches. This arc length is indicated in FIG. 2 at 38. Additionally, it has been found preferable to dimension concave side 26a so that it conforms at least generally to an arc defined by a radial dimension residing generally in the range of about 2 to $3\frac{1}{2}$ inches. Lastly, in order to provide a comfortable grip, chain tightener 10 is preferably constructed with handle member 26 having a width, indicated at 40, generally in the range of $\frac{1}{2}$ to 1-inch.

Figure 6:
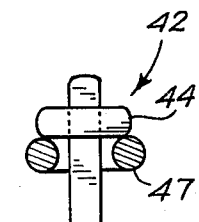
FIG. 6 is a view taken along lines 6—6 of FIG. 5 and illustrates a retaining means for holding the chain tightener in a stabilized position.
Figure 7:
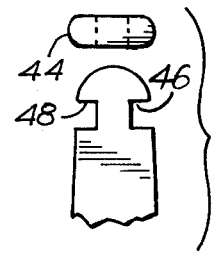
FIG. 7 is an exploded view illustrating how the retaining means is held on the free end of the tightener.

A further feature of chain tightener 10 of the present invention is the inclusion of a retaining means, generally indicated at 42 in FIG. 1. Attention is also directed to FIG. 6 which shows details of retaining means 42. The retaining means is provided for holding free end 28 internally of a link which receives the free end when the perimeter chain is drawn up in the locked position. As shown in FIGS. 1 and 6, retaining means 42 includes a flexible ring-like element 44 which is mounted and held, as in a snap-fit, in a pair of notches formed in free end 28. For instance, as shown in FIG. 7, opposed notches such as indicated at 46, 48 receive ring-like element 44 and hold same to free end 28. The ring-like element is sufficiently flexible to permit it to be bent or biased as it is pushed through end link 20.

Figure 3:
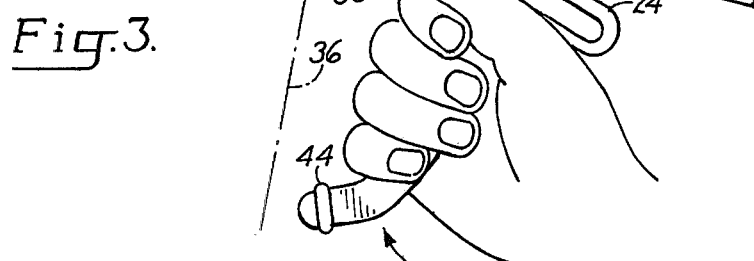
FIG. 3 is a view similar to FIGS. 1 and 2 illustrating grasping of the chain tightener by an individual's hand about an arcuate handle member of the chain tightener so that the individual may force or cam the free end of the chain tightener toward a receiving link.
Figure 4:
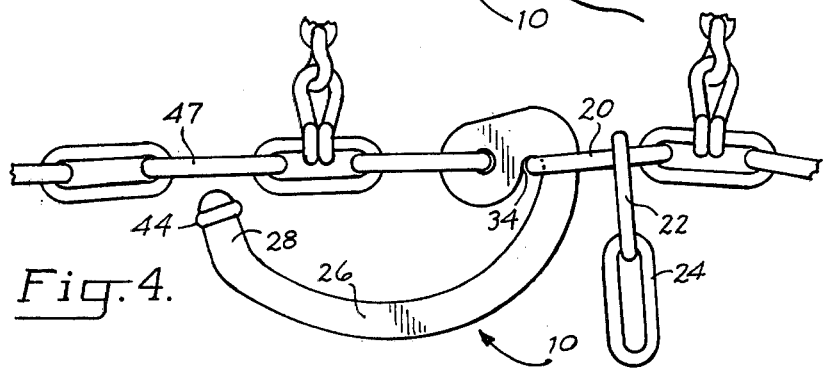
FIG. 4 is a view similar to FIGS. 1-3 illustrating locking of the chain tightener after opposed end links of the perimeter chain have been drawn together.

Turning now to a description of an actual locking sequence utilizing chain tightener 10, attention is initially focused on FIG. 1 which shows free end 28 about to be inserted into a selected opposed end link such as end link 20. FIG. 2 illustrates free end 28 having been pushed through the end link with element 44 having been bent or flexed as it passes through the end link. Next, as shown in FIG. 3, an individual may securely grasp onto handle member 26 and rotate the chain tightener in a clockwise direction, as shown, to provide camming action with concave side 26a pulling end link 20 toward end link 18 until end link 20 snaps into notch 34. This is the position shown in FIG. 4 and it is noted that free end 28 is disposed adjacent to a receiving link such as indicated at 47. It is also to be noted that FIG. 4 illustrates a "locked position" with chain tightener 10 being self-locked and perimeter chain 12 drawn to a tightened and secured position.

In order to stabilize the chain tightener, free end 28 is pushed upwardly through link 47 to the position shown in FIG. 5. Ring-like element 44, being dimensioned with a width greater than the internal width of link 47, prevents free end 28 from working loose. If it is desired to release the chain tightener, a relatively small manual force must be applied, in a counterclockwise direction, to urge ring-like element 44 through the width of link 47. As shown in FIG. 5, the outer profile of chain tightener 10 closely approximates the outer circumferential profile of perimeter chain 12. It can be seen that free end 28 and end lug 30 are closely positioned adjacent perimeter chain 12. As such, there is little likelihood that the free end or end lug would contact the road surface.

Free end 28 is not a continuation of the arcuate form of handle member 26. Rather, the free end is oriented toward concave side 26a an amount which will permit the free end to be directed substantially vertically relative to the plane of an end link during insertion thereinto.

As mentioned previously, it has been found preferable to dispose eyelet 32 and notch 34 so that imaginary line 36 is disposed closely adjacent to the tip of free end 28. By closely adjacent, it is meant that the imaginary line should extend no more than 1½ inches above the tip, with a preferable spacing above the tip being in the range of one-quarter of an inch.

While the present invention has been shown and described with reference to the foregoing preferred embodiment, it will be apparent to those skilled in the art that other changes in form of detail may be made therein without departing from the spirit and scope of the invention as defined in the dependent claims.

It is claimed and desired to secure by Letters Patent:

1. A chain tightener for interconnecting opposed end links of a perimeter chain of a tire chain mounted on a tire comprising:
   an arcuate handle member including a free end and a lug end, said lug end being provided with an eyelet for pivotally receiving an end link of the perimeter chain with said free end being insertable into an opposite end link of the perimeter chain and movable therethrough to draw up the perimeter chain into a locked position, said handle member being dimensioned for grasping by all of the fingers of an individual's hand; and
   catch means disposed adjacent said lug end for receiving and holding said opposite end link when the perimeter chain is disposed in said locked position, said catch including a notch having a circular portion configured for nesting the opposite end link in said locked position;
   said eyelet and said notch being positioned relative to one another so that an imaginary line interconnecting their centers and extending toward said free end is spaced from said free end.

2. The chain tightener of claim 1, wherein said handle member is defined by opposed concave-convex sides, said lug end being oriented toward said concave side of said handle member.

3. The chain tightener of claim 2, wherein said concave side is generally defined by an arc having a radial dimension residing in the range of about 2 to 3½ inches.

4. The chain tightener of claim 2 wherein said handle members is defined by an arc length dimension in the range of about 3 to 5 inches.

5. The chain tightener of claim 1, wherein said free end is provided with flexible retaining means for holding said free end internally of a link which receives said free end when said perimeter chain is drawn up in said locked position.

6. The chain tightener of claim 5 wherein said retaining means includes a ring-like element coupled to said free end, said free end including notch means for receiving said ringlike element and permitting same to be biased.

7. A chain tightener for interconnecting opposed end links of a perimeter chain of a tire chain mounted on a tire comprising:
   an arcuate handle member including a free end and a lug end, said lug end being pivotally connected to an end link of the perimeter chain with said free end being insertable into an opposite end link of the perimeter chain and movable therethrough to draw up the perimeter chain into a locked position, said handle member being dimensioned for grasping by all of the fingers of an individual's hand;
   catch means disposed adjacent said lug end for receiving and holding said opposite end link when the perimeter chain is disposed in said locked position; and
   flexible retaining means mounted on said free end for holding said free end internally of the end link which receives said free end when the perimeter chain is drawn up in said locked position, said retaining means being dimensioned to span across the inside width of the end link after it has been biased to pass through the end link.

* * * * *